United States Patent
Sakaguchi et al.

(10) Patent No.: US 10,697,664 B2
(45) Date of Patent: Jun. 30, 2020

(54) MANAGEMENT APPARATUS AND AIR-CONDITIONING SYSTEM

(71) Applicant: Mitsubishi Electric Corporation, Tokyo (JP)

(72) Inventors: Hiroaki Sakaguchi, Tokyo (JP); Mitsuru Kitazaki, Tokyo (JP); Tomoki Okuno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/083,636

(22) PCT Filed: May 16, 2016

(86) PCT No.: PCT/JP2016/064496
§ 371 (c)(1),
(2) Date: Sep. 10, 2018

(87) PCT Pub. No.: WO2017/199295
PCT Pub. Date: Nov. 23, 2017

(65) Prior Publication Data
US 2019/0226710 A1    Jul. 25, 2019

(51) Int. Cl.
*F24F 11/89* (2018.01)
*H04Q 9/00* (2006.01)
(Continued)

(52) U.S. Cl.
CPC ............. *F24F 11/89* (2018.01); *F24F 11/58* (2018.01); *F24F 11/62* (2018.01); *H04Q 9/00* (2013.01); *H04Q 9/02* (2013.01)

(58) Field of Classification Search
None
See application file for complete search history.

(56) References Cited

U.S. PATENT DOCUMENTS 9,247,142 B2 *   1/2016   Kim .................. H04N 5/23293
9,791,839 B2 * 10/2017   Matsuoka ............. G05B 15/02
(Continued)

FOREIGN PATENT DOCUMENTS

JP    2005-049656 A    2/2005
JP    2012-033141 A    2/2012
(Continued)

OTHER PUBLICATIONS

Office Action dated Aug. 6, 2019 issued in corresponding JP patent application No. 2018-517938 (and English translation).
(Continued)

*Primary Examiner* — K. Wong
(74) *Attorney, Agent, or Firm* — Posz Law Group, PLC (57) ABSTRACT

Provided is a management apparatus, which is to be connected to a device, and is configured to manage the device. The management apparatus includes: a display unit configured to display a state of the device; and a wireless communication unit configured to wirelessly communicate to and from a mobile terminal. When a distance between the mobile terminal and the management apparatus has become smaller than a threshold value, the management apparatus displays on the display unit management program information on a management program for managing the device.

19 Claims, 8 Drawing Sheets

(51) Int. Cl.
  *F24F 11/62*     (2018.01)
  *F24F 11/58*     (2018.01)
  *H04Q 9/02*      (2006.01)

(56)         References Cited

U.S. PATENT DOCUMENTS 9,952,571  B2 *  4/2018  Zhang .................... G05B 15/02
 10,088,818  B1 * 10/2018  Mathews ............ H04L 12/2825
 10,142,122  B1 * 11/2018  Hill ..................... H04L 12/2807
 10,345,767  B2 *  7/2019  Li .......................... G05B 15/02
 10,409,652  B2 *  9/2019  Shrivastava ........... G06Q 50/10
 10,425,241  B2 *  9/2019  Kim ........................ H04L 12/28
 10,440,545  B2 * 10/2019  Horton ................ H04L 12/2818
 2012/0045059 A1   2/2012  Fujinami
 2012/0202479 A1   8/2012  Sugitani et al.
 2013/0229507 A1   9/2013  Matsumoto
 2015/0256693 A1   9/2015  Kubo et al.
 2019/0086108 A1 * 3/2019  Okita ................. G05B 19/048

FOREIGN PATENT DOCUMENTS

JP     2013-183423  A    9/2013
 JP     2015-064154  A    4/2015
 JP     2015-129638  A    7/2015
 JP     2015-167326  A    9/2015
 WO     2010/131415 A1   11/2010

OTHER PUBLICATIONS

International Search Report of the International Searching Authority dated Jul. 26, 2016 for the corresponding international application No. PCT/JP2016/064496 (and English translation).
Office Action dated Feb. 18, 2020 issued in corresponding JP patent application No. 2018-517938 (and English translation).

* cited by examiner

MANAGEMENT APPARATUS AND AIR-CONDITIONING SYSTEM

CROSS REFERENCE TO RELATED APPLICATION

This application is a U.S. national stage application of International Application No. PCT/JP2016/064496, filed on May 16, 2016, the contents of which are incorporated herein by reference.

TECHNICAL FIELD

The present invention relates to a management apparatus and an air-conditioning system, which are configured to manage a device to be managed, for example, an air conditioning apparatus.

BACKGROUND

Hitherto, there has been known a technology of managing an air conditioning apparatus through use of a mobile terminal, for example, a smartphone (see, for example, Patent Literature 1). In an air-conditioning system of Patent Literature 1, a user downloads a management program for an air conditioning apparatus onto a mobile terminal, to thereby be able to manage the air conditioning apparatus through use of the mobile terminal.

However, even when an air conditioning apparatus that supports an application program for operating the air conditioning apparatus is installed, a user who does not recognize this fact cannot download the management program. Therefore, in the related art, another medium, such as a user's manual, point-of-purchase (POP) advertising, or webpage of the air conditioning apparatus, is used to prompt a user to download the management program. In particular, in order to prompt a visitor to use a mobile terminal owned by the visitor to operate an air conditioning apparatus installed in a room in which the visitor stays temporarily or for only a short period of time, it is required to show information for prompting the visitor to download the management program, which is a dedicated application program, separately on POP advertisement, a user's guide, or other such medium.

PATENT LITERATURE

Patent Literature 1: Japanese Unexamined Patent Application Publication No. 2015-129638

However, even when a user is prompted to download the management program through POP advertisement or other such medium as in the related art, many users do not take notice of, or get interested in, the POP advertisement or other such medium. Accordingly, a rate of users downloading the management program and a utilization rate thereof remain at a low level, and thus it is currently difficult to provide the user with a comfortable operability of the air conditioning apparatus using the mobile terminal.

SUMMARY

The present invention has been made in order to solve the above-mentioned problem, and it is an object of the present invention to provide a management apparatus and an air-conditioning system, which are capable of increasing a rate of users downloading a management program for an air conditioning apparatus onto a mobile terminal and a utilization rate of the management program, to thereby extend an operability of the air conditioning apparatus.

According to one embodiment of the present invention, there is provided a management apparatus, which is to be connected to a device, and is configured to manage the device, the management apparatus including: a display unit configured to display a state of the device; and a wireless communication unit configured to wirelessly communicate to and from a mobile terminal, wherein, when a distance between the mobile terminal and the management apparatus has become smaller than a threshold value, the management apparatus displays on the display unit management program information on a management program for managing the device.

According to one embodiment of the present invention, when the distance between the mobile terminal and the management apparatus has become smaller than the threshold value, the management program information is displayed on the display unit, and hence it is possible to efficiently enable the user of the mobile terminal to recognize that the management program is available. It is therefore possible to increase the rate of downloading of the management program for the air conditioning apparatus onto the mobile terminal and the utilization rate of the management program, to thereby extend the operability of the air conditioning apparatus.

DETAILED DESCRIPTION

Embodiment 1

Figure 1:
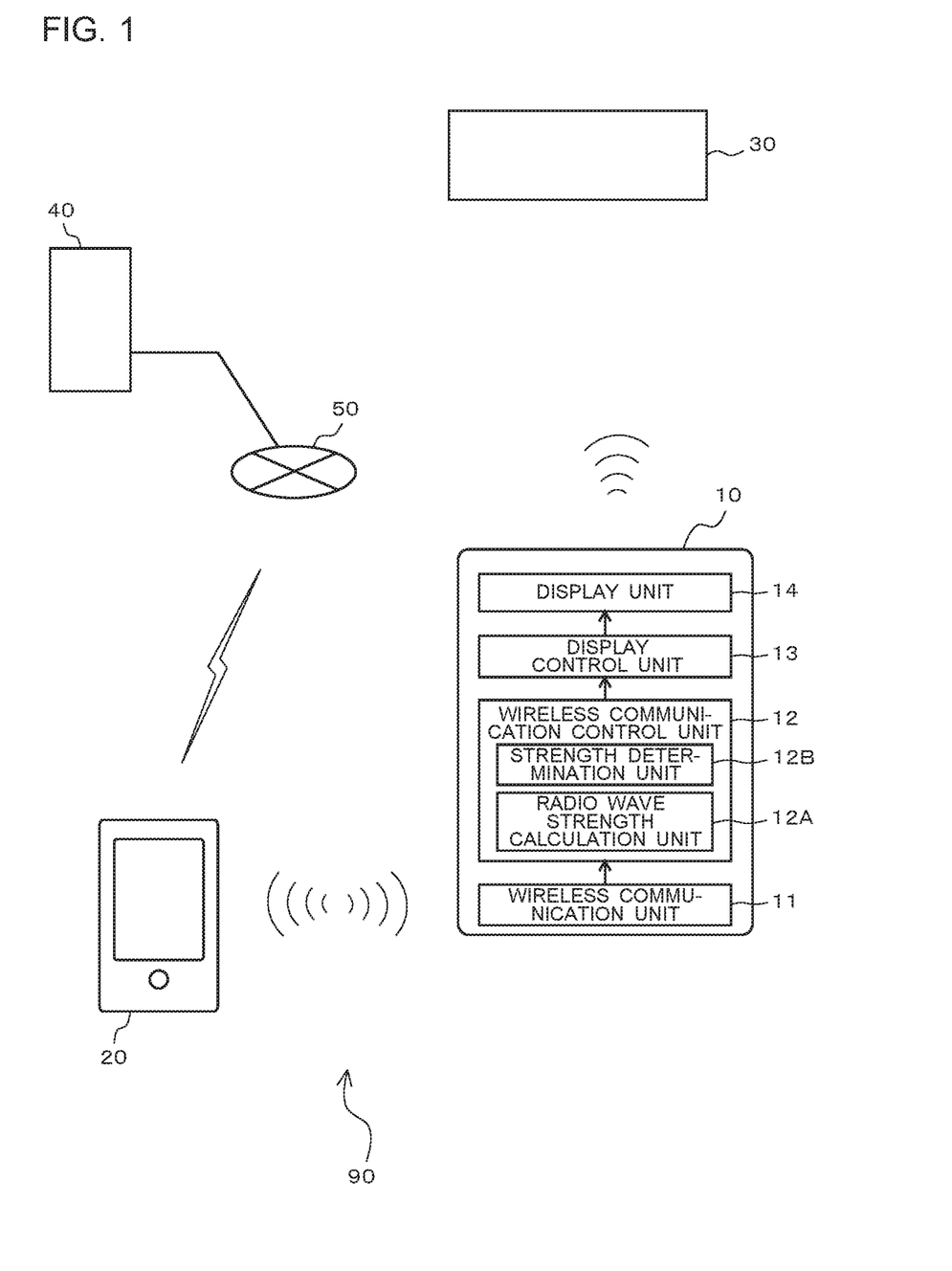
FIG. 1 is a schematic diagram illustrating a configuration of a device management system in Embodiment 1 of the present invention.

FIG. 1 is a schematic diagram illustrating a configuration of a device management system 90 in Embodiment 1 of the present invention. As illustrated in FIG. 1, the device management system 90 includes a management apparatus 10, a mobile terminal 20, an air conditioning apparatus 30, and an application management server 40. Herein, the device management system 90 in Embodiment 1 corresponds to an "air-conditioning system" of the present invention.

The mobile terminal 20 is a terminal that can be carried around by a user, such as a cell phone, a smartphone, a tablet PC, or a notebook PC. The mobile terminal 20 has a function of communicating information based on any communication standard such as Bluetooth (registered trademark) or a wireless LAN, for example, Wi-Fi (registered trademark).

The air conditioning apparatus 30 is installed in an air-conditioned space, for example, a room, and is configured to adjust temperature, humidity, cleanliness, and other conditions of air of the air-conditioned space. The air conditioning apparatus 30 may be a separate-type air conditioning apparatus, in which an indoor unit and an outdoor unit are separately installed, or may be an integrated-type air conditioning apparatus, in which a function of the indoor unit and a function of the outdoor unit are combined. The air conditioning apparatus 30 may also be a ventilation device configured to exchange the air of the air-conditioned space and outdoor air, an air-cleaning device configured to remove, for example, dust floating in the air, a humidifier configured to increase humidity of the air of the air-conditioned space, or other such devices. The application management server 40 is configured to store and manage a management program, which is a dedicated application program for managing the air conditioning apparatus 30.

Herein, the management program is a dedicated application program for assigning a function of managing the air conditioning apparatus 30 to the mobile terminal 20. The management program includes a program for causing the mobile terminal 20 to implement at least one of a function of controlling the air conditioning apparatus 30 to turn on or off the air conditioning apparatus 30 or a function of adjusting a control quantity for controlling the air conditioning apparatus 30. Through use of the mobile terminal 20 having the management program downloaded thereon to be installed therein, the user can remotely operate and manage the air conditioning apparatus 30.

For example, when the air conditioning apparatus 30 includes an indoor unit and an outdoor unit, the management apparatus 10 is connected to the indoor unit configured to air-condition the room, for example. The mobile terminal 20 having the management program installed therein can implement a function of managing the indoor unit of the air conditioning apparatus 30. The management program may be configured to enable the user to use the mobile terminal 20 having the management program installed therein to check management information such as an amount of electric power used or an electricity rate.

The mobile terminal 20 is a terminal that can be carried around by a user, such as a cell phone, a smartphone, a tablet PC, or a notebook PC. The mobile terminal 20 has a function of communicating information based on any communication standard such as Bluetooth (registered trademark) or a wireless LAN, for example, Wi-Fi (registered trademark). The mobile terminal 20 has a function of downloading, via a public communication line 50, the management program for the air conditioning apparatus 30 from the application management server 40 and installing the management program therein.

The management apparatus 10 is connected to the air conditioning apparatus 30 wirelessly or via a cable to manage the air conditioning apparatus 30. The management apparatus 10 is installed, for example, on a wall surface of the room, or on a desk, a rack, or a shelf of a bed, which is provided in the room. The management apparatus 10 includes a wireless communication unit 11, a wireless communication control unit 12, a display control unit 13, and a display unit 14. The wireless communication unit 11 is configured to wirelessly communicate to/from the mobile terminal 20. The wireless communication unit 11 includes a detection unit (not shown) configured to detect a wireless signal emitted by the mobile terminal 20. In Embodiment 1, the detection unit of the wireless communication unit 11 has a short-range communication function, which is a function of performing short-range communication. Further, the detection unit of the wireless communication unit 11 is configured to use the short-range communication function to detect a radio wave from the mobile terminal 20 as the wireless signal. In Embodiment 1, the wireless communication unit 11 is configured to detect radio waves from the mobile terminal 20 at fixed time intervals. Herein, the radio wave from the mobile terminal 20 refers to a radio wave emitted when the mobile terminal 20 enables its short-range communication function. The short-range communication function is a function of performing communication based on, for example, Bluetooth (registered trademark) or a wireless LAN. The radio wave from the mobile terminal 20 is hereinafter sometimes referred to simply as "radio wave".

Further, the wireless communication unit 11 is configured to individually detect the radio wave from each of the plurality of mobile terminals 20 when, for example, there are a plurality of users each having the mobile terminal 20 in which the short-range communication function is enabled in the air-conditioned space in which the management apparatus 10 is installed.

The wireless communication control unit 12 is configured to search for, based on the radio wave detected by the wireless communication unit 11, the mobile terminal 20 in which the short-range communication function is enabled in the vicinity of the management apparatus 10. The wireless communication control unit 12 also has a function of relaying the communication between the mobile terminal 20 and the air conditioning apparatus 30.

The wireless communication control unit 12 includes a radio wave strength calculation unit 12A and a strength determination unit 12B. The radio wave strength calculation unit 12A is configured to obtain, as a radio wave strength, an average value of radio waves from the same mobile terminal 20 that have been detected by the wireless communication unit 11 within a set period of time. In this case, the set period of time is set to a period of time that is longer than a fixed period of time required for the wireless communication unit 11 to detect the radio wave, and thus the wireless communication unit 11 detects the radio wave from the same mobile terminal 20 a plurality of times within the set period of time. The radio wave strength calculation unit 12A may also obtain a value of a single radio wave that has been detected by the wireless communication unit 11 as the radio wave strength.

The strength determination unit 12B is configured to determine whether or not the radio wave strength obtained by the radio wave strength calculation unit 12A is equal to or larger than a radio wave strength threshold value set in advance. The radio wave strength threshold value is set on the basis of, for example, a general position at which the user can recognize information displayed on the display unit 14. That is, the radio wave strength threshold value is set on the basis of a radio wave from the mobile terminal 20 that is placed at a position serving as the basis for setting the radio wave strength threshold value. In this case, the position serving as the basis for setting the radio wave strength threshold value may be set to be changed as appropriate in consideration of the size of a room in which the management apparatus 10 is to be installed, a positional relationship between the management apparatus 10 and the air conditioning apparatus 30 in the room, or other conditions. A distance between a position at which the management apparatus 10 is installed and the position serving as the basis for setting the radio wave strength threshold value corresponds to a "threshold value" in the present invention. That is, the strength determination unit 12B is configured to determine whether or not a distance between the mobile terminal 20 and the management apparatus 10 has become smaller than the threshold value.

The radio wave strength threshold value is set in the manner described above, and hence, when the radio wave strength is equal to or larger than the radio wave strength threshold value, it can be determined that the mobile terminal 20 in which the short-range communication function is enabled has approached the management apparatus 10. Thus, the strength determination unit 12B is configured to notify the display control unit 13 of an information display instruction when the radio wave strength is equal to or larger than the radio wave strength threshold value.

Meanwhile, when the radio wave strength has temporarily become equal to or larger than the radio wave strength threshold value and then has become smaller than the radio wave strength threshold value, it is assumed that the user of the mobile terminal 20 has moved to a position at which the user cannot sufficiently identify the management apparatus 10. Thus, the strength determination unit 12B is configured to notify the display control unit 13 of a display switching instruction when the radio wave strength has temporarily become equal to or larger than the radio wave strength threshold value and then has become smaller than the radio wave strength threshold value. The radio wave strength threshold value corresponding to the display switching instruction and the radio wave strength threshold value corresponding to the information display instruction may be the same value or different values. For example, when the radio wave strength threshold value corresponding to the display switching instruction is set to a value larger than the radio wave strength threshold value corresponding to the information display instruction, it is possible to avoid a situation in which, for example, the strength determination unit 12B repeatedly transmits the information display instruction and the display switching instruction in response to a slight change in radio wave strength, and hence it is possible to increase stability of control.

In this case, the radio wave strength calculation unit 12A has a function of, when the wireless communication unit 11 detects radio waves from a plurality of mobile terminals 20, sorting the radio waves to associate each radio wave with a corresponding mobile terminal 20, to thereby obtain the radio wave strength of each of the mobile terminals 20. The strength determination unit 12B is further configured to notify the display control unit 13 of the information display instruction when the radio wave strength corresponding to any one of the plurality of mobile terminals 20 is equal to or larger than the radio wave strength threshold value.

The display control unit 13 is configured to display on the display unit 14 management program information on the management program for managing the air conditioning apparatus 30 when the information display instruction is notified from the strength determination unit 12B. When the display unit 14 is not in a sleep state and a menu screen or another screen is displayed thereon, and the distance between the mobile terminal 20 and the management apparatus 10 has become smaller than the threshold value, the display control unit 13 switches display on the display unit 14 to display of the management program information.

The display unit 14 includes, for example, a liquid crystal display, and is configured to display information on the air conditioning apparatus 30. The display unit 14 may also be, for example, a touch panel including a display panel configured to display a character, an image, or other information and a detection unit laminated on the display panel to detect touching on the detection unit.

As described above, the management apparatus 10 is configured to display the management program information on the display unit 14 when the distance between the mobile terminal 20 and the management apparatus 10 has become smaller than the threshold value. It is preferred that the management apparatus 10 be configured such that the display unit 14 is lit up when the distance between the mobile terminal 20 and the management apparatus 10 has become smaller than the threshold value. Specifically, it is preferred that, when the strength determination unit 12B determines that the distance to the mobile terminal 20 becomes shorter than the threshold value based on the wireless communication by the wireless communication unit 11, the display control unit 13 lights up a screen displayed on the display unit 14. Then, for example, when the wireless communication control unit 12 determines that the radio wave strength is equal to or larger than the radio wave strength threshold value, the display control unit 13 may light up a backlight unit provided to the display unit 14 at a brightness higher than a set normal brightness until an initial display period elapses. It is preferred that the initial display period be set to a relatively short period of time, for example, from 5 seconds to 15 seconds. In this case, the set normal brightness refers to, for example, a brightness exhibited when a home screen, a menu screen, or other such screen is displayed on the display unit 14. When the mobile terminal 20 has approached the management apparatus 10, and the display unit 14 has already been lit up because the home screen, the menu screen, or other such screen has been displayed on the display unit 14, it is preferred that the display control unit 13 increase the brightness of the display unit 14. The display control unit 13 may make the brightness of the backlight unit provided to the display unit 14 higher than a normal brightness during a period in which the management program information is displayed.

Further, when the mobile terminal 20 has spaced away from the management apparatus 10, the management apparatus 10 may remove from the display unit 14 the display of the management program information displayed on the display unit 14. More specifically, the wireless communication control unit 12 may have a function of detecting, based on the wireless signal detected by the wireless communication unit 11, that the mobile terminal 20 has moved in a direction away from the management apparatus 10. Then, when the distance between the mobile terminal 20 and the management apparatus 10 has temporarily become smaller than the threshold value, and then the distance from the management apparatus 10 has become equal to or larger than a fixed distance, the wireless communication control unit 12 may remove the management program information from the display unit 14. That is, for example, when the mobile terminal 20 has spaced away from the management apparatus 10, the management apparatus 10 may switch the state of the display unit 14 from a state in which the management program information is displayed on the display unit 14 to a switched-off state, in which no information is displayed on the display unit 14. Further, when the mobile terminal 20 has gotten away from the management apparatus 10, the management apparatus 10 may switch the display on the display unit 14 from the display of the management program information to display of other information. In this case, the display of other information refers to, for example, display of the home screen or display of the menu screen. The display of other information may also be display of information that has been displayed immediately before the display of the management program information.

In addition, the management apparatus 10 may have a function of determining whether or not the management program has been installed in the mobile terminal 20. For example, the mobile terminal 20 having the management program installed therein emits a wireless signal containing information indicating that the management program has been installed therein when the management program is being executed, for example. That is, when the management apparatus 10 receives from the mobile terminal 20 the wireless signal containing the information indicating that the management program has been installed therein, the management apparatus 10 may determine that the management program has been installed in the mobile terminal 20. Then, when the management program is not installed in the mobile terminal 20 the distance to which has become smaller than the threshold value, the management apparatus 10 may display the management program information on the display unit 14, and when the management program has been installed in the mobile terminal 20 the distance to which has become smaller than the threshold value, the management apparatus 10 may avoid displaying the management program information on the display unit 14. That is, when the distance between the mobile terminal 20 having the management program installed therein and the management apparatus 10 has become smaller than the threshold value, the management apparatus 10 may avoid displaying the management program information on the display unit 14, and when the distance between the mobile terminal 20 in which the management program is not installed and the management apparatus 10 has become smaller than the threshold value, the management apparatus 10 may display the management program information on the display unit 14.

Figure 2:
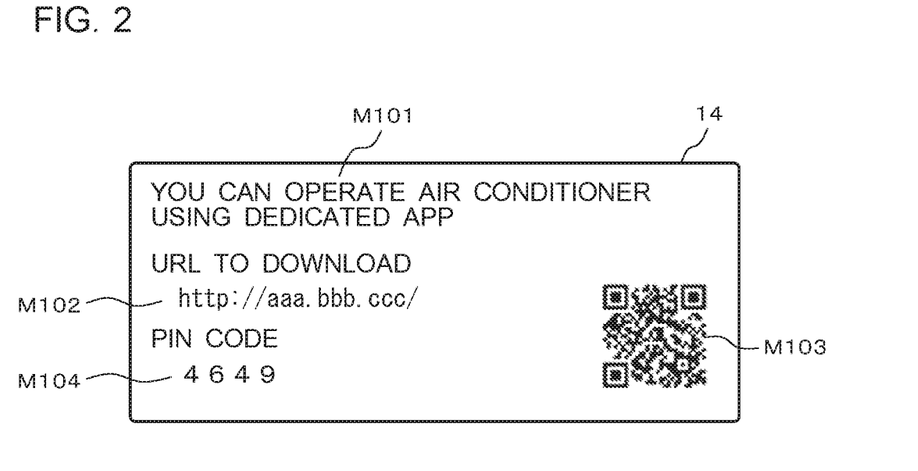
FIG. 2 is an explanatory diagram illustrating an example of management program information to be displayed on a display unit of FIG. 1.

FIG. 2 is an explanatory diagram illustrating an example of the management program information to be displayed on the display unit 14 of FIG. 1. As illustrated in FIG. 2, on the display unit 14, for example, a message M101, download information M102 and code information M103, which serve as information on a URL from which the management program is to be downloaded, and connection authentication information M104 are displayed as the management program information. The management program information is stored in advance in an internal memory (not shown) or another storage location of the management apparatus 10. When the information display instruction is notified from the strength determination unit 12B, the display control unit 13 reads out the management program information from the internal memory or another storage location to display the management program information on the display unit 14.

The message M101 is information indicating that the management program is available. The download information M102 is address information on an address of the application management server 40, in which the management program is stored, that is, information containing a character string indicating the URL from which the management program is to be downloaded. The code information M103 is a QR code (registered trademark) indicating the URL from which the management program is to be downloaded.

The connection authentication information M104 is identification information for identifying the management apparatus 10. More specifically, the connection authentication information M104 is, for example, a PIN code, and is information required when the mobile terminal 20 and the management apparatus 10 are to be connected to each other by the short-range communication after the user downloads the management program. When the user downloads the management program, the user is requested to input the connection authentication information M104 on a screen displayed on the mobile terminal 20. At this time, when the user inputs, for example, "4649" illustrated in FIG. 2, the user is enabled to operate the air conditioning apparatus 30 with the mobile terminal 20.

The device management system 90 may also be configured such that the air conditioning apparatus 30 is directly operated through use of the mobile terminal 20. Further, the device management system 90 may include a relay apparatus configured to relay the communication between the mobile terminal 20 and the air conditioning apparatus 30. When one of the above-mentioned configurations is adopted, the wireless communication control unit 12 is not required to have the function of relaying the communication between the mobile terminal 20 and the air conditioning apparatus 30.

The wireless communication control unit 12 and the display control unit 13 may be implemented by a circuit device or other such hardware for implementing the above-mentioned functions, or may be implemented as software to be executed on a microcomputer, for example, a digital signal processor (DSP), or an arithmetic unit, for example, a central processing unit (CPU). In addition, the above-mentioned internal memory or another storage location may be constructed of a hard disk drive (HDD), a flash memory, or other such memory.

Figure 3:
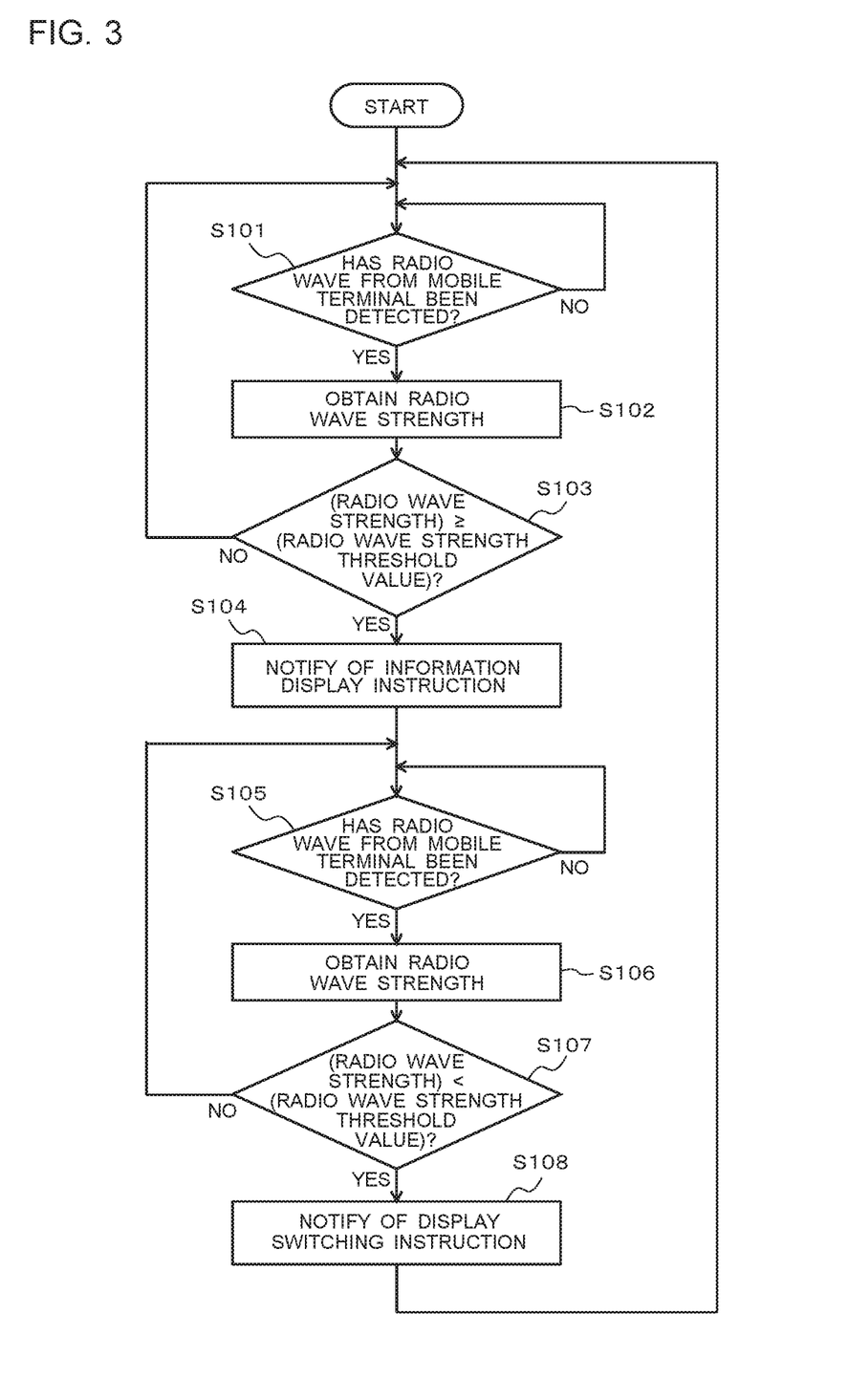
FIG. 3 is a flowchart illustrating an operation of a wireless communication control unit included in a management apparatus of FIG. 1.
Figure 4:
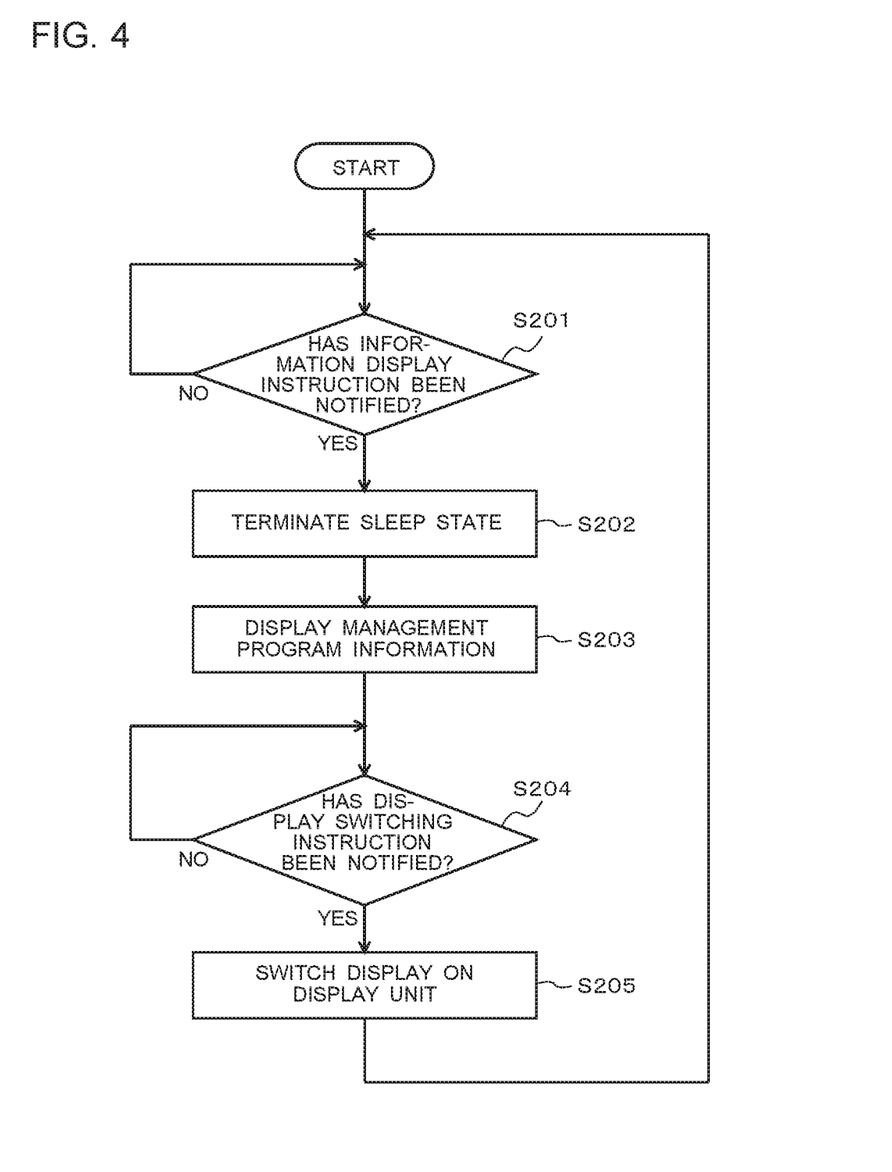
FIG. 4 is a flowchart illustrating an operation of a display control unit included in the management apparatus of FIG. 1.

FIG. 3 is a flowchart illustrating an operation of the wireless communication control unit 12 included in the management apparatus 10 of FIG. 1. FIG. 4 is a flowchart illustrating an operation of the display control unit 13 included in the management apparatus 10 of FIG. 1. Referring to FIG. 3 and FIG. 4, a description is given of a method of managing the air conditioning apparatus 30 by the management apparatus 10.

First, a description is given of the operation of the wireless communication control unit 12 with reference to FIG. 3.

The wireless communication control unit 12 waits until the wireless communication unit 11 detects the radio wave from the mobile terminal 20 (FIG. 3: Step S101/No).

When the wireless communication unit 11 detects the radio wave from the mobile terminal 20 (FIG. 3: Step S101/Yes), the wireless communication unit 11 outputs information on the detected radio wave to the wireless communication control unit 12. The wireless communication control unit 12 obtains a radio wave strength of the mobile terminal 20 based on the information on the radio wave output from the wireless communication unit 11 (FIG. 3: Step S102).

Next, the wireless communication control unit 12 determines whether or not the obtained radio wave strength is equal to or larger than the radio wave strength threshold value (FIG. 3: Step S103). When the radio wave strength is smaller than the radio wave strength threshold value (FIG. 3: Step S103/No), the wireless communication control unit 12 does not perform any processing, and returns to Step S101. Meanwhile, when the radio wave strength is equal to or larger than the radio wave strength threshold value (FIG.

3: Step S103/Yes), it can be determined that the mobile terminal 20 in which the short-range communication function is enabled has approached the management apparatus 10, and hence the wireless communication control unit 12 notifies the display control unit 13 of the information display instruction (FIG. 3: Step S104).

Next, in the same manner as in Step S101, the wireless communication control unit 12 waits until the information on the radio wave is output from the wireless communication unit 11 (FIG. 3: Step S105/No). Then, when the information on the radio wave is output from the wireless communication unit 11 (FIG. 3: Step S105/Yes), in the same manner as in Step S102, the wireless communication control unit 12 obtains a radio wave strength of the mobile terminal 20 (FIG. 3: Step S106).

Next, the wireless communication control unit 12 determines whether or not the obtained radio wave strength is smaller than the radio wave strength threshold value (FIG. 3: Step S107). When the radio wave strength is equal to or larger than the radio wave strength threshold value (FIG. 3: Step S107/No), the wireless communication control unit 12 returns to Step S105. Meanwhile, when the radio wave strength is smaller than the radio wave strength threshold value (FIG. 3: Step S107/Yes), the wireless communication control unit 12 notifies the display control unit 13 of the display switching instruction (FIG. 3: Step S108), and returns to Step S101. In the manner described above, the wireless communication control unit 12 repeatedly executes the series of processing steps of Step S101 to Step S108.

Next, a description is given of the operation of the display control unit 13 with reference to FIG. 4.

The display control unit 13 waits until the information display instruction is notified from the wireless communication control unit 12 (FIG. 4: Step S201/No). When the information display instruction is notified from the wireless communication control unit 12, the display control unit 13 terminates the sleep state of the display unit 14 (FIG. 4: Step S202). Then, the display control unit 13 reads out the management program information from the internal memory or another storage location, and displays the management program information on the display unit 14 (FIG. 4: Step S203).

Next, the display control unit 13 waits until the display switching instruction is notified from the wireless communication control unit 12 (FIG. 4: Step S204/No). When the display switching instruction is notified from the wireless communication control unit 12 (FIG. 4: Step S204/Yes), the display control unit 13 switches the display on the display unit 14. Specifically, in response to the display switching instruction from the wireless communication control unit 12, the display control unit 13 switches the display on the display unit 14 from the display of the management program information to display of the home screen or other such screen (FIG. 4: Step S205). The display control unit 13 then repeatedly executes the series of processing steps of Step S201 to Step S205.

In Step S205, the display control unit 13 may switch the state of the display unit 14 to a state in which no information is displayed thereon, for example, to the sleep state. Further, in Step S205, the display control unit 13 may switch the state of the display unit 14 to the state in which no information is displayed thereon when a fixed period of time elapses after the home screen or other such screen is displayed on the display unit 14.

In the above description of the operations, it is assumed that the display unit 14 is in the sleep state at least during a series of processing steps of from FIG. 3 to Step S201 of FIG. 4, but a case in which the display unit 14 is not in the sleep state when the information display instruction is notified from the wireless communication control unit 12 is also conceivable. Thus, in such a case, the display control unit 13 proceeds to Step S203 without executing Step S202. In FIG. 4, the case in which the display control unit 13 switches display on the display unit 14 in response to the display switching instruction from the wireless communication control unit 12 is exemplified, but the present invention is not limited thereto. For example, the display control unit 13 may switch the display on the display unit 14 when a preset period of time elapses while waiting for the display switching instruction to be notified from the wireless communication control unit 12 (FIG. 4: Step S204/No).

As described above, when the user of the mobile terminal 20 has approached the management apparatus 10, the management apparatus 10 according to Embodiment 1 can display on the display unit 14 a screen intended to prompt the user to download the management program. Specifically, when it is determined by the wireless communication control unit 12 that the radio wave strength is equal to or larger than the radio wave strength threshold value, the management apparatus 10 displays the management program information on the display unit 14. As a result, it is possible to enable the user near the management apparatus 10 to recognize that the management program is available. Therefore, with the management apparatus 10, it is possible to increase the rate of users downloading the management program for the air conditioning apparatus 30 onto the mobile terminal 20 and the utilization rate of the management program, to thereby extend and enhance the operability of the air conditioning apparatus 30.

Further, the radio wave strength calculation unit 12A obtains the average value of the radio waves from the same mobile terminal 20 that have been detected by the wireless communication unit 11 within the set period of time as the radio wave strength, and hence, for example, an error of detection by the wireless communication unit 11 can be reduced. As a result, an accuracy of determination by the wireless communication control unit 12 can be increased, and hence the mobile terminal 20 can be searched for with high accuracy.

In Embodiment 1, the case in which the message M101, the download information M102, the code information M103, and the connection authentication information M104 are displayed on the display unit 14 is exemplified, but the present invention is not limited thereto. For example, the display control unit 13 may display on the display unit 14, as the management program information, at least one of the message M101, the download information M102, or the code information M103. The display of the download information M102 as the management program information enables the user to recognize at a glance that the download information M102 is a URL from which the management program is to be downloaded. Further, the display of the code information M103 as the management program information eliminates the user's need to manually input the URL, and hence the usability for the user is increased. Moreover, the display of both the download information M102 and the code information M103 as the management program information enables the user to recognize the download information M102 and the code information M103 in association with each other. This enables the user to strongly recognize that the management program is available, and hence the rate of downloading of the management program by the user can be increased.

The display control unit 13 may further display the connection authentication information M104 as the management program information. When the connection authentication information M104 is displayed together with other information in this manner, the user is not required to switch a screen on the display, for example. In addition, it is possible to notify the user in advance that the user is requested to input the connection authentication information M104, and hence downloading and initial setting of the management program can be performed smoothly.

The display control unit 13 may inhibit the message M101 from being displayed as the management program information. Even with this configuration, because downloading of a dedicated application program through use of a smartphone or other such terminal is actively performed nowadays, it is possible to enable the user to download the management program. However, when the message M101 is displayed on the display unit 14, it is possible to enable the user to more strongly recognize that the management program is available.

Modification Example 1

Figure 5:
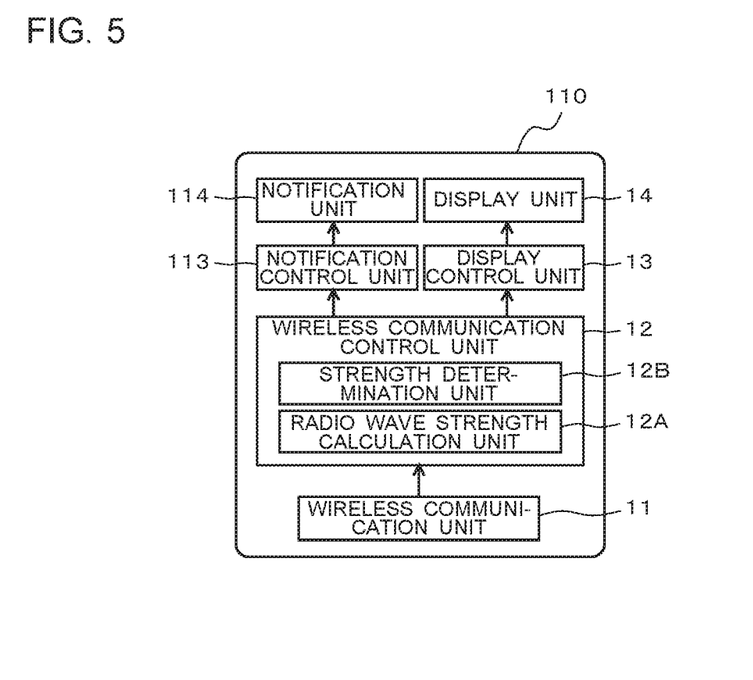
FIG. 5 is a block diagram illustrating a functional configuration of a management apparatus according to Modification Example 1 of Embodiment 1 of the present invention.

FIG. 5 is a block diagram illustrating a functional configuration of a management apparatus according to Modification Example 1 of Embodiment 1 of the present invention. Components of the management apparatus according to Modification Example 1 that are equivalent to the management apparatus 10 described above are denoted with the same reference numerals, and a description thereof is omitted.

As illustrated in FIG. 5, a management apparatus 110 according to Modification Example 1 includes a notification control unit 113 and a notification unit 114. Management program information in Modification Example 1 includes attraction information for attracting attention of the user to prompt the user to obtain the management program. The notification unit 114 is configured to output the attraction information. In Modification Example 1, the notification unit 114 includes a speaker, for example, to output a sound or a voice as the attraction information. The notification control unit 113 is configured to, when it is determined by the wireless communication control unit 12 that the radio wave strength is equal to or larger than the radio wave strength threshold value, cause the notification unit 114 to output as the attraction information a voice announcement, for example, "You can operate air conditioning apparatus using dedicated app.", that is, a voice for attracting attention.

In this case, when it is determined by the wireless communication control unit 12 that the radio wave strength is equal to or larger than the radio wave strength threshold value, the notification control unit 113 may cause the notification unit 114 to output a sound for attracting attention, for example, a beep sound, as the attraction information. Further, when it is determined by the wireless communication control unit 12 that the radio wave strength is equal to or larger than the radio wave strength threshold value, the notification control unit 113 may cause the notification unit 114 to output both of the sound for attracting attention and the voice for attracting attention as the attraction information. For example, the notification control unit 113 may cause the notification unit 114 to first output the sound for attracting attention and then output the voice for attracting attention. Other configurations and operations of the management apparatus 110 are the same as those of the management apparatus 10.

As described above, when it is determined by the wireless communication control unit 12 that the radio wave strength is equal to or larger than the radio wave strength threshold value, the management apparatus 110 according to Modification Example 1 further causes the notification unit 114 to output at least one of the sound for attracting attention or the voice for attracting attention. It is therefore possible to attract attention of the user and to arouse the user's interest in the management apparatus 110, from which the sound or the voice is output. Thus, with the management apparatus 110, it is possible to further increase the rate of downloading of the management program for the air conditioning apparatus 30 onto the mobile terminal 20 and the utilization rate of the management program, to thereby extend and enhance the operability of the air conditioning apparatus 3.

The notification unit 114 may output, as the attraction information, a vibration instead of a sound or a voice. Further, the notification unit 114 may output, as the attraction information, a vibration together with a sound or a voice. That is, when it is determined by the wireless communication control unit 12 that the radio wave strength is equal to or larger than the radio wave strength threshold value, the notification control unit 113 may output at least one of a sound, a voice, and a vibration as the attraction information. Further, when the distance between the mobile terminal 20 and the management apparatus 110 has become smaller than the threshold value, the management apparatus 110 may cause the notification unit 114 to notify of the fact that the mobile terminal 20 has approached the management apparatus 110.

Modification Example 2

Figure 6:
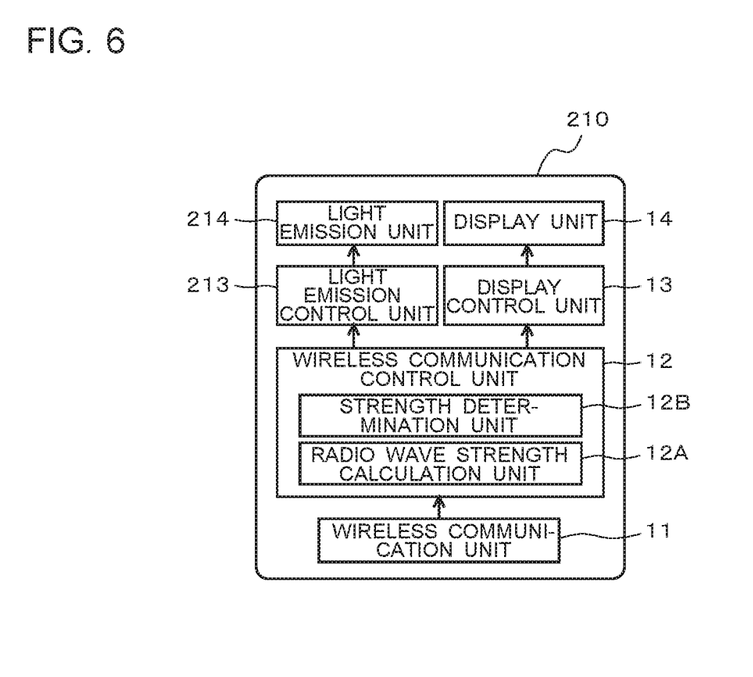
FIG. 6 is a block diagram illustrating a functional configuration of a management apparatus according to Modification Example 2 of Embodiment 1 of the present invention.

FIG. 6 is a block diagram illustrating a functional configuration of a management apparatus according to Modification Example 2 of Embodiment 1 of the present invention. Components of the management apparatus according to Modification Example 2 that are equivalent to the management apparatus 10 described above are denoted with the same reference numerals, and a description thereof is omitted.

As illustrated in FIG. 6, a management apparatus 210 according to Modification Example 2 includes a light emission control unit 213 and a light emission unit 214. The light emission unit 214 includes one or more LEDs, for example. The light emission control unit 213 is configured to blink or light up the light emission unit 214 when it is determined by the wireless communication control unit 12 that the radio wave strength is equal to or larger than the radio wave strength threshold value.

As described above, when it is determined by the wireless communication control unit 12 that the radio wave strength is equal to or larger than the radio wave strength threshold value, the management apparatus 210 according to Modification Example 2 further blinks or lights up the light emission unit 214. It is therefore possible to attract attention of the user and to arouse the user's interest in the management apparatus 110, which lights up or blinks. Thus, with the management apparatus 110, it is possible to further increase the rate of downloading of the management program for the air conditioning apparatus 30 onto the mobile terminal 20 and the utilization rate of the management program, to thereby extend and enhance the operability of the air conditioning apparatus 30. When the distance between the mobile terminal 20 and the management apparatus 110 has become smaller than the threshold value, the management apparatus 210 may cause the light emission unit 214 to notify of the fact that the mobile terminal 20 has approached the management apparatus 110.

In the management apparatus 10 according to Embodiment 1, the configurations of Modification Example 1 and Modification Example 2 may be combined with each other. That is, the management apparatus 10 may further include the notification control unit 113, the notification unit 114, the light emission control unit 213, and the light emission unit 214. Further, when the distance between the mobile terminal 20 and the management apparatus 10 has become smaller than the threshold value, the management apparatus 10 may cause at least one of the notification unit 114 or the light emission unit 214 to notify of the fact that the mobile terminal 20 has approached the management apparatus 10. Herein, the notification unit 114 and the light emission unit 214 correspond to a "notification unit configured to issue a notification by sound or light" of the present invention.

Embodiment 2

Figure 7:
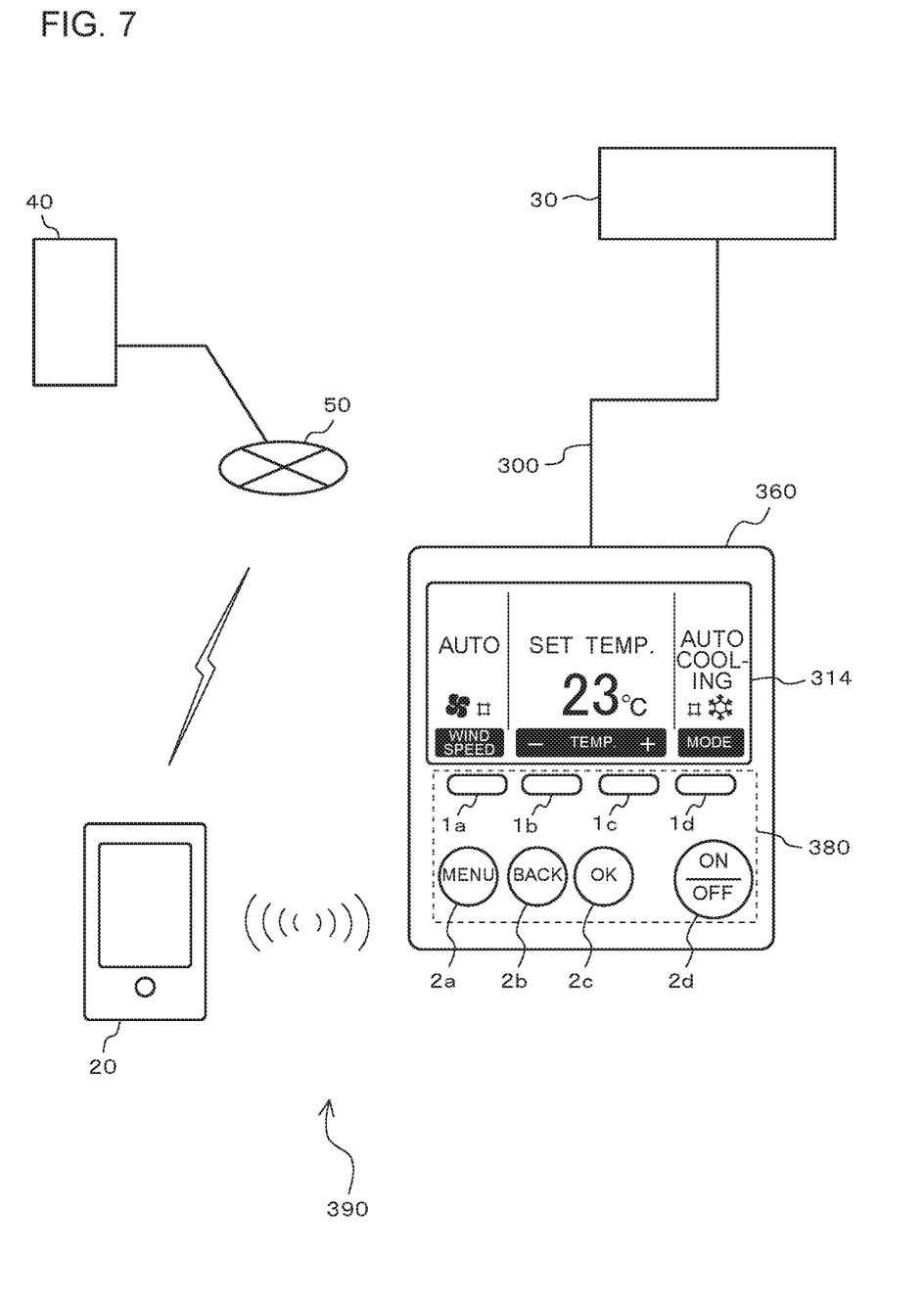
FIG. 7 is a schematic diagram illustrating a configuration of a device management system in Embodiment 2 of the present invention.
Figure 8:
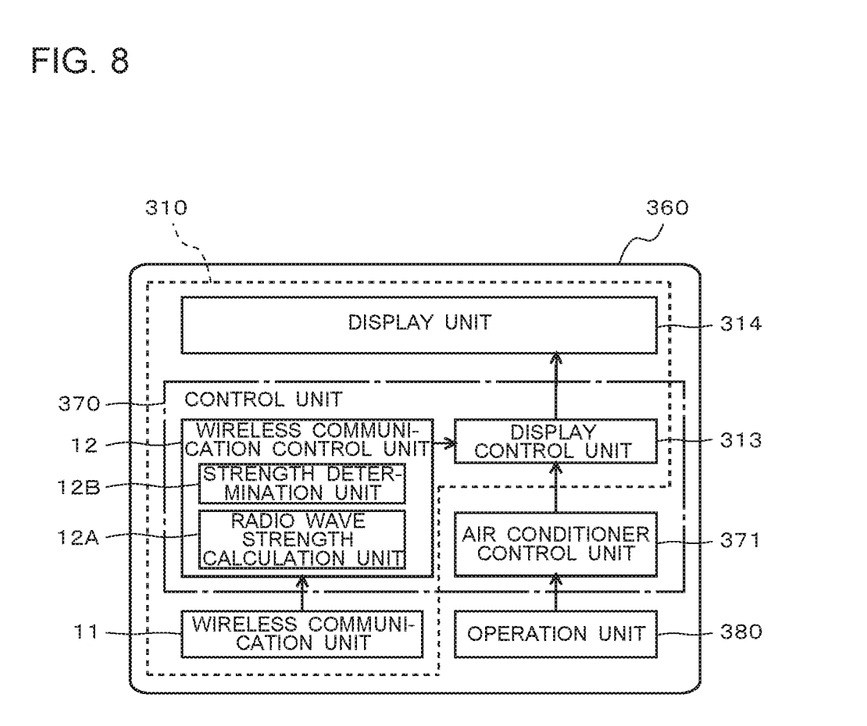
FIG. 8 is a block diagram illustrating a functional configuration of a management apparatus of FIG. 7.

FIG. 7 is a schematic diagram illustrating a configuration of a device management system in Embodiment 2 of the present invention. FIG. 8 is a block diagram illustrating a functional configuration of a management apparatus of FIG. 7. Components of the device management system and the management apparatus in Embodiment 2 that are equivalent to those of Embodiment 1 described above are denoted with the same reference numerals, and a description thereof is omitted.

As illustrated in FIG. 7, a device management system 390 in Embodiment 2 includes the mobile terminal 20, the air conditioning apparatus 30, the application management server 40, and a remote controller 360. Herein, the device management system 390 in Embodiment 2 corresponds to the "air-conditioning system" of the present invention. The remote controller 360 and the air conditioning apparatus 30 are connected to each other by a transmission line 300. This enables the remote controller 360 to monitor the air conditioning apparatus 30.

The remote controller 360 is installed on a wall of, for example, a room being an air-conditioned space, and includes the wireless communication unit 11, a control unit 370, a display unit 314, and an operation unit 380. The display unit 314 includes, for example, a liquid crystal display, and is configured to display information on an operation performed on the air conditioning apparatus, an operation state of the air conditioning apparatus 30, a state of air of the air-conditioned space, and other such information.

The control unit 370 includes a display control unit 313, the wireless communication control unit 12, and an air conditioning apparatus control unit 371. The air conditioning apparatus control unit 371 is configured to acquire detection values obtained by various sensors (not shown) provided to the air conditioning apparatus 30 to monitor the air conditioning apparatus 30 and control an operation of the air conditioning apparatus 30. The display control unit 313 is configured to display various screen on the display unit 314 in response to the information display instruction or the display switching instruction notified from the wireless communication control unit 12 and the air conditioning apparatus control unit 371. In FIG. 7, there is exemplified a case in which the display control unit 313 displays on the display unit 314 a normal remote controller screen indicating details of settings of the air conditioning apparatus 30 in response to the information display instruction from the air conditioning apparatus control unit 371 or the display switching instruction from the wireless communication control unit 12. Further, in response to the information display instruction from the wireless communication control unit 12, the display control unit 313 displays on the display unit 314 management program information for prompting the user to download the management program, for example, the information illustrated in FIG. 2. That is, the display control unit 313 has functions similar to those of the display control unit 13 in Embodiment 1.

The operation unit 380 is configured to receive an input operation performed by the user to transmit a signal indicating details of the operation to the control unit 370. The remote controller 360 includes, as the operation unit 380, for example, a plurality of function keys 1a to 1d, to which various functions are assigned depending on a screen displayed on the display unit 314, and a plurality of fixed keys 2a to 2d, to which specific functions are fixedly assigned.

When the display unit 314 displays information on a wind speed, information on a set temperature, and information on an operation mode as illustrated in FIG. 7, the function key 1a receives a change of setting of the wind speed, the function key 1b and the function key 1c each receive a change of the set temperature, and the function key 1d receives a change of the operation mode. Further, when the fixed key 2a written as "menu" is depressed by the user, the display control unit 313 displays a menu screen on the display unit 314. When the fixed key 2b written as "back" is depressed by the user, the display control unit 313 displays a previous screen on the display unit 314. When the user uses the plurality of function keys 1a to 1d or other keys to perform an input operation, and depresses the fixed key 2c written as "OK", the air conditioning apparatus control unit 371 updates settings relating to the air conditioning apparatus 30 in accordance with details of input by the user. When the fixed key 2d written as "operation/stop" is depressed by the user, the air conditioning apparatus control unit 371 stops or starts the operation of the air conditioning apparatus 30.

In other words, the remote controller 360 includes, as illustrated in FIG. 8, a management apparatus 310 including the wireless communication unit 11, the wireless communication control unit 12, the display control unit 313, and the display unit 314. As described above, the management apparatus 310 functions in the same manner as the management apparatus 10 according to Embodiment 1 described above.

In FIG. 7, the case in which the remote controller 360 communicates to/from the air conditioning apparatus 30 via a cable is exemplified, but the present invention is not limited thereto. The remote controller 360 may be configured to communicate to/from the air conditioning apparatus 30 in accordance with any communication standard such a wireless LAN, infrared communication, or Bluetooth (registered trademark). As described above, even in a case where the air conditioning apparatus 30 can be remotely operated by using the remote controller 360, through use of the mobile terminal 20 having the management program downloaded thereon to be installed therein, it is possible to operate the air conditioning apparatus 30 more smoothly. The display unit 314 may also be, for example, a touch panel including a display panel configured to display a character, an image, or other information and a detection unit laminated on the display panel to detect touching on the detection unit.

Figure 9:
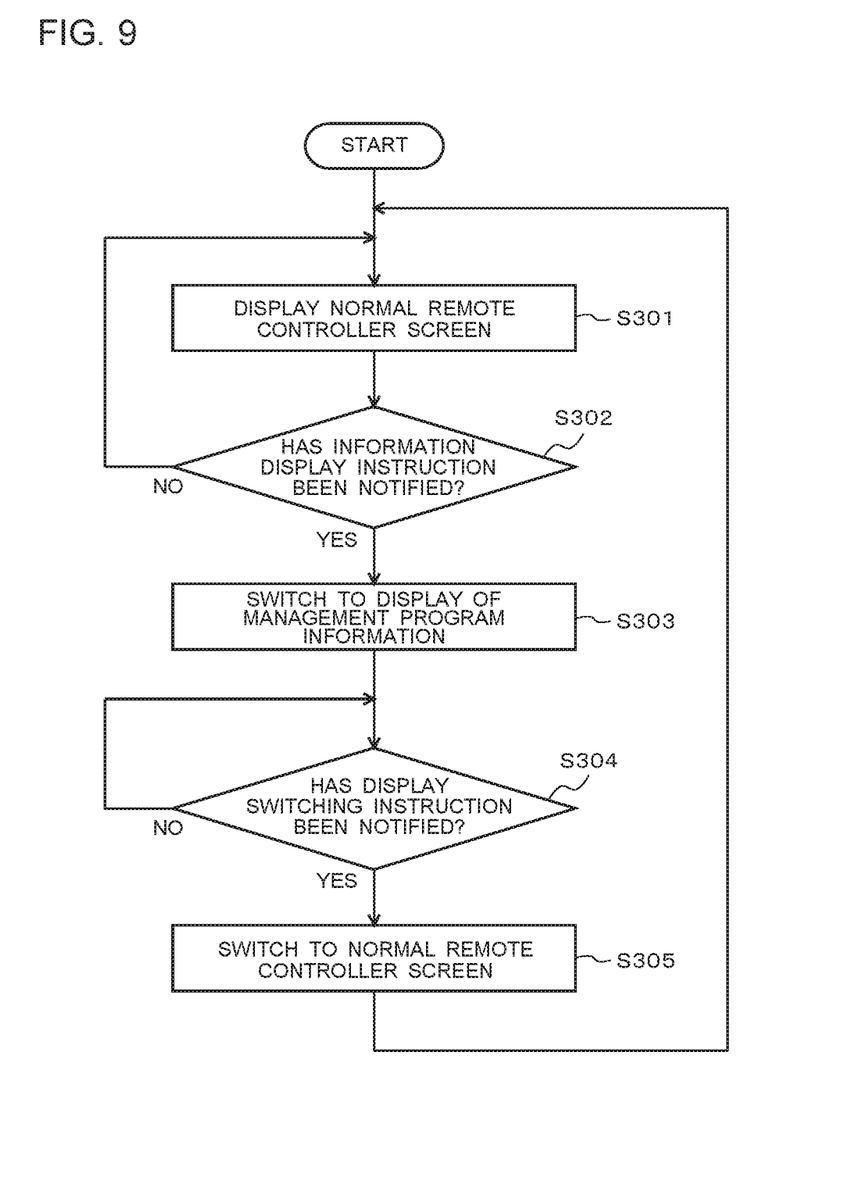
FIG. 9 is a flowchart illustrating an operation of a display control unit included in the management apparatus of FIG. 8.

FIG. 9 is a flowchart illustrating an operation of the display control unit 313 included in the management apparatus 310 of FIG. 8. Referring to FIG. 9, a description is given of a method of managing the air conditioning apparatus 30 by the management apparatus 310. An operation of the wireless communication control unit 12 is the same as that of FIG. 3.

The management apparatus 310 according to Embodiment 2 is built into the remote controller 360, and the display control unit 13 displays on the display unit 314 a remote controller screen, for example, the screen illustrated in FIG. 7 (FIG. 9: Step S301). The display control unit 13 then waits until the information display instruction is notified from the wireless communication control unit 12 while displaying the remote controller screen on the display unit 314 (FIG. 9: Step S302/No). That is, the display control unit 13 returns to Step S301 to maintain the state in which the remote controller screen is displayed on the display unit 314.

When the information display instruction is notified from the wireless communication control unit 12 (FIG. 9: Step S302/Yes), the display control unit 13 reads out the management program information from the internal memory or another storage location to switch display on the display unit 314 from display of the remote controller screen to display of the management program information (FIG. 9: Step S303).

Next, the display control unit 13 waits until the display switching instruction is notified from the wireless communication control unit 12 (FIG. 9: Step S304/No). When the display switching instruction is notified from the wireless communication control unit 12 (FIG. 9: Step S304/Yes), the display control unit 13 switches the display on the display unit 314. Specifically, in response to the display switching instruction from the wireless communication control unit 12, the display control unit 13 switches the display on the display unit 14 from the display of the management program information to display of the remote controller screen (FIG. 9: Step S305). The display control unit 13 then repeatedly executes the series of processing steps of Step S301 to Step S305.

In Step S301 of FIG. 9, it is assumed that the remote controller screen is displayed on the display unit 314, but the present invention is not limited thereto. For example, the remote controller 360 may have a sleep mode, in which at least the display unit 314 enters a sleep state when a predetermined period of time has elapsed since the air conditioning apparatus 30 stopped the operation. Then, in the same manner as in the operation illustrated in FIG. 4, when the information display instruction is notified from the wireless communication control unit 12, the display control unit 313 may terminate the sleep state of the display unit 14. Further, the display control unit 13 may switch the display on the display unit 14 when a preset period of time elapses while waiting for the display switching instruction to be notified from the wireless communication control unit 12 (FIG. 9: Step S304/No).

As described above, when the user of the mobile terminal 20 has approached the remote controller 360, the remote controller 360 can switch display on the display unit 314 to display of a screen intended to prompt the user to download the management program. That is, the remote controller 360 is configured to switch display on the display unit 314 to display of the management program information when the existence of the mobile terminal 20 is verified through use of the short-range wireless communication function, and hence the remote controller 360 can enable the user to recognize that the management program is available.

That is, when it is determined by the wireless communication control unit 12 that the radio wave strength is equal to or larger than the radio wave strength threshold value, the management apparatus 310 displays the management program information on the display unit 14. As a result, it is possible to enable the user near the remote controller 360 to recognize that the management program is available. Therefore, with the remote controller 360, it is possible to increase the rate of downloading of the management program for the air conditioning apparatus 30 onto the mobile terminal 20 and the utilization rate of the management program, to thereby extend and enhance the operability of the air conditioning apparatus 30.

In this case, in the same manner as in, for example, the management apparatus 110 or the management apparatus 210 according to Embodiment 2, the management apparatus 310 according to Embodiment 2 may include at least one of the combination of the notification control unit 113 and the notification unit 114 or the combination of the light emission control unit 213 and the light emission unit 214. Further, when the distance between the mobile terminal 20 and the management apparatus 310 has become smaller than the threshold value, the management apparatus 310 according to Embodiment 2 may cause at least one of the notification unit 114 or the light emission unit 214 to notify of the fact that the mobile terminal 20 has approached the management apparatus 310.

Each of the above-mentioned embodiments is a preferred specific example of the management apparatus and the air-conditioning system, and the technical scope of the present invention is not limited to those modes. For example, the wireless communication unit 11 may detect, with the detection unit, a light beam or an ultrasonic wave as the wireless signal emitted by the mobile terminal 20. That is, the wireless communication unit 11 may be configured to use a light beam or an ultrasonic wave to wirelessly communicate to/from the mobile terminal 20.

Further, in each of the above-mentioned embodiments, a description has been given of the example in which the wireless communication control unit 12 uses the wireless signal to detect the fact that the mobile terminal 20 has approached the management apparatus 10, 110, 210 and 310, but the present invention is not limited thereto. Each of the management apparatus 10, 110, 210, and 310 may include a distance sensor, for example. Further, when such a configuration is adopted, each of the management apparatus 10, 110, 210, and 310 may use a detection result obtained by the distance sensor, for example, to detect the fact that the mobile terminal 20 has approached the management apparatus 10, 110, 210, or 310. That is, it is only required that each of the management apparatus 10, 110, 210, and 310 include a proximity determination unit configured to use, for example, the wireless signal detected by the wireless communication unit 11 or the detection result obtained by the distance sensor to determine whether or not the distance between the mobile terminal 20 and the management apparatus 10, 110, 210, or 310 has become smaller than the threshold value. The distance sensor may also be an optical sensor including, for example, an LED or a laser diode, or may be a sensor other than an optical sensor, for example, an ultrasonic sensor.

The device management system in each of the above-mentioned embodiments may include a plurality of management apparatus each configured to function in the same manner as the management apparatus 10, and the air conditioning apparatus 30 may include a plurality of indoor units. Further, each of the management apparatus and each of the indoor units may be associated with each other on a one-to-one basis. Specifically, for example, the device management system may include a first management apparatus and a second management apparatus as the plurality of management apparatus, and the air conditioning apparatus 30 may include a first indoor unit connected to the first management apparatus and a second indoor unit connected to the second management apparatus. In this configuration, a set of the first management apparatus and the first indoor unit and a set of the second management apparatus and the second indoor unit may be installed in the same room, or may be installed in different rooms. Further, the mobile terminal 20 may manage the first indoor unit via the first management apparatus or may manage the second indoor unit via the second management apparatus. Specifically, when identification information for identifying the first management apparatus has been input to the mobile terminal 20 having a management program for managing the first indoor unit installed therein, the mobile terminal 20 may be enabled to manage the first indoor unit. Similarly, when identification information for identifying the second management apparatus has been input to the mobile terminal 20 having a management program for managing the second indoor unit installed therein, the mobile terminal 20 may be enabled to manage the second indoor unit. The same applies to a case in which the device management system includes three or more management apparatus and three or more indoor units.

In each of the above-mentioned embodiments, the air conditioning apparatus 30 is taken as an example of the device to be managed by the management apparatus 10 and other management apparatus, but the present invention is not limited thereto. The device to be managed by the management apparatus 10 and other management apparatus may also be a water heater, a floor heating device, a television, a DVD recorder, a stereo device, a lighting device, or other such devices.

The invention claimed is:

1. A management apparatus, which is adapted to be connected to a device, and is configured to manage the device, the management apparatus comprising:
   a processor;
   a display configured to display a state of the device; and
   a wireless communicator configured to wirelessly communicate to and from a mobile terminal,
   the processor is configured to
      determine whether a distance between the mobile terminal and the management apparatus has become smaller than a predetermined threshold value which indicates a position at which a user of the mobile terminal can view information on the display;
      responsive to determining that the distance has become smaller than the threshold value, display on the display management program information indicating that a management program for managing the device by the mobile terminal is present.

2. The management apparatus of claim 1, wherein, when the distance between the mobile terminal and the management apparatus has become smaller than the threshold value, a brightness of the display is increased.

3. The management apparatus of claim 1, wherein, when the distance between the mobile terminal and the management apparatus has become smaller than the threshold value, the display is switched, and the management program information is displayed on the display.

4. The management apparatus of claim 1, wherein, when the distance between the mobile terminal and the management apparatus has become equal to or larger than the threshold value, the management program information displayed on the display is removed.

5. The management apparatus of claim 4, wherein, when the distance between the mobile terminal and the management apparatus has become equal to or larger than the threshold value, the display is switched, and the management program information displayed on the display is removed.

6. The management apparatus of claim 5, wherein, when the distance between the mobile terminal and the management apparatus has become equal to or larger than the threshold value, the display is switched, and information that has been displayed on the display immediately before the management program information is displayed on the display.

7. The management apparatus of claim 1, wherein the management program information includes attraction information for prompting acquisition of the management program.

8. The management apparatus of claim 1, wherein the management program information includes address information on an address of a server in which the management program is stored.

9. The management apparatus of claim 1, wherein, when the distance between the mobile terminal and the management apparatus has become smaller than the threshold value, identification information for identifying the management apparatus is further displayed on the display.

10. The management apparatus of claim 1, wherein the management apparatus is installed on a wall surface.

11. The management apparatus of claim 1, wherein the display includes:
   a display panel configured perform display; and
   a detection unit laminated on the display panel to detect touching on the detection unit.

12. The management apparatus of claim 1, further comprising a notification unit configured to issue a notification by sound or light,
   wherein, when the distance between the mobile terminal and the management apparatus has become smaller than the threshold value, the notification unit notifies of a fact that the mobile terminal has approached the management apparatus.

13. The management apparatus of claim 1,
   wherein the wireless communicator includes a detector configured to detect a wireless signal emitted by the mobile terminal, and
   wherein the management apparatus is configured to use a strength of the wireless signal detected by the detector to determine the distance between the mobile terminal and the management apparatus.

14. The management apparatus of claim 13, wherein the management apparatus is configured to use an average value of the strength of the wireless signal to determine the distance between the mobile terminal and the management apparatus.

15. The management apparatus of claim 14, wherein the management program includes a program for causing the mobile terminal to implement at least one of a function of controlling the device to turn on or off the device or a function of adjusting a control quantity for controlling the device.

16. An air-conditioning system, comprising:
   the management apparatus of claim 1; and
   an indoor unit connected to the management apparatus and configured to air-condition a room,
   wherein the mobile terminal having the management program installed therein is configured to manage the indoor unit.

17. The air-conditioning system of claim 16, wherein the management apparatus is configured to:
  avoid displaying the management program information on the display when a distance between a mobile terminal having the management program installed therein and the management apparatus has become smaller than the threshold value; and
  display the management program information on the display when a distance between a mobile terminal in which the management program is not installed and the management apparatus has become smaller than the threshold value.

18. The air-conditioning system of claim 16,
  wherein the indoor unit includes:
    a first indoor unit; and
    a second indoor unit,
  wherein the management apparatus includes:
    a first management apparatus connected to the first indoor unit; and
    a second management apparatus connected to the second indoor unit, and
  wherein the mobile terminal is configured to:
    manage the first indoor unit via the first management apparatus; or
    manage the second indoor unit via the second management apparatus.

19. The air-conditioning system of claim 18, wherein a set of the first indoor unit and the first management apparatus and a set of the second indoor unit and the second management apparatus are installed in different rooms.

* * * * *